United States Patent
Webb

(12) 
(10) Patent No.: US 6,208,675 B1
(45) Date of Patent: Mar. 27, 2001

(54) BLOWER ASSEMBLY FOR A PULSED LASER SYSTEM INCORPORATING CERAMIC BEARINGS

(75) Inventor: R. Kyle Webb, Escondido, CA (US)

(73) Assignee: Cymer, Inc., San Diego, CA (US)

( * ) Notice: Subject to any disclaimer, the term of this patent is extended or adjusted under 35 U.S.C. 154(b) by 0 days.

(21) Appl. No.: 09/141,068

(22) Filed: Aug. 27, 1998

(51) Int. Cl.⁷ ........................................................ H01S 3/36
(52) U.S. Cl. .............................................. 372/58; 415/111
(58) Field of Search ...................... 372/57, 58; 415/53.1, 415/111, 229

(56) References Cited

U.S. PATENT DOCUMENTS

| | | | |
|---|---|---|---|
| 4,959,840 | * | 9/1990 | Akins et al. ............................. 372/57 |
| 5,206,873 | * | 4/1993 | Funakubo et al. ...................... 372/58 |
| 5,291,509 | | 3/1994 | Mizoguchi et al. .................... 372/65 |
| 5,771,258 | | 6/1998 | Morton et al. .......................... 372/57 |

FOREIGN PATENT DOCUMENTS

| | | |
|---|---|---|
| 4-109685 | 4/1992 | (JP) . |
| 5-21866 | 1/1993 | (JP) . |
| 10-173259 | 6/1998 | (JP) . |

OTHER PUBLICATIONS

Patent Abstracts of Japan, Publication No. 05021866 A, publication date Jan. 29, 1993, 1 page.
Patent Abstracts of Japan, Publication No. 04109685 A, publication date Apr. 10, 1992, 1 page.
Patent Abstracts of Japan, Publication No. 10173259 A, publication date, Jun. 26, 1998, 1 page.
Carre, "The Use of Solid Ceramic and Ceramic Hard–Coated Components to Prolong the Performance of Perfluoropolyalkylether Lubricants," *Surface and Coatings Technology,* 43/44 (1990) 609–617. (No Month).

* cited by examiner

*Primary Examiner*—James W. Davie
(74) *Attorney, Agent, or Firm*—Brian D. Ogonowsky, E

(57) ABSTRACT

A blower assembly for circulating gases in a laser chamber. The blower assembly includes a driving assembly operatively engaged to a drive side shaft for rotating a fan assembly. A first bearing assembly supports the drive side shaft. The blower assembly may further include an idle side shaft for supporting the fan assembly and a second bearing assembly circumscribing the idle side shaft. The driving assembly includes a motor disposed over a rotor. The fan assembly includes a pair of hubs supporting a plurality of blades. The first and second bearing assemblies comprise a ceramic compound, such as silicon nitride ($Si_3N_4$), and are lubricated with a synthetic oil, such as perfluoropolyalkylether (PFPE).

25 Claims, 10 Drawing Sheets

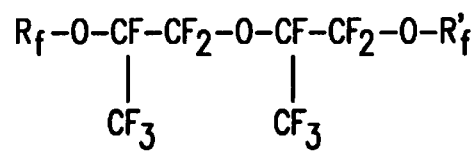
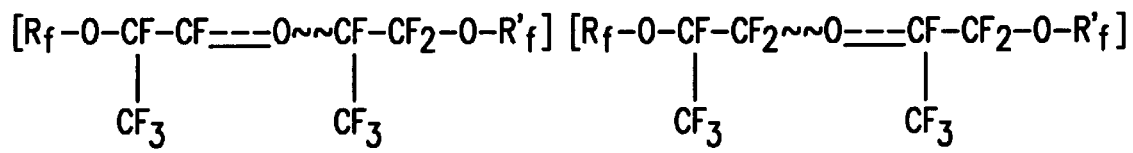
FIG.12

BLOWER ASSEMBLY FOR A PULSED LASER SYSTEM INCORPORATING CERAMIC BEARINGS

FIELD OF THE INVENTION

This invention relates to laser systems and, more specifically, to a blower assembly for circulating gases within a laser discharge chamber of the laser system.

BACKGROUND OF THE INVENTION

Pulsed laser systems, such as excimer lasers, are well known. FIG. 11 is an end cross sectional view of a laser chamber, generally illustrated as 10, used in a conventional pulsed laser system. The laser chamber 10 includes an electrode structure 22 defining an electrical discharge area 28, a heat exchanger 60, and a blower assembly 70. As is well known by those skilled in the art, the pulsed laser system produces energy pulses from a gas mixture that is between the electrode structure 22. The mixture of gas, which typically includes krypton and fluorine, is maintained at a high pressure (e.g., 3 atm). The electrode structure 22 ionizes the gas mixture to produce a high energy discharge. A life cycle of the gas mixture is measured by the total number of high energy discharges that the gas mixture can produce. Typically the life cycle ranges from about 100 to about 200 million discharges.

The blower assembly 70 plays the important role of circulating the gases in the laser chamber 10 of pulsed laser systems. The circulation of the gases harbors may purposes, among them which include, but are not limited to, maintaining the temperature of the gases at the most efficient level of reaction, maximizing the life cycle of the gases, and facilitating the overall operation of the pulsed laser system. As mentioned above, krypton and fluorine are gases commonly employed by the laser chamber 10. These gases, however, may adversely affect the mechanical operation of the blower assembly 70, as well as the performance of the pulsed laser system. To pose the problem more concretely, by way of example, the blower assembly 70 is generally defined by a mechanical structure which includes a motor coupled to a shaft by a lubricated bearing assembly such as a ball bearing. The shaft rotates a fan for the circulation of the gases. The bearing assembly has conventionally been manufactured from ferrous material such as 440C stainless steel. The use of ferrous metals harbors a variety of problems. First, the gases, i.e., krypton and fluorine, are capable of corroding and etching the structure of the bearing assembly, and therefore, diminishing the mechanical integrity of the bearing assembly. Second, fluorine reacts with iron, forming iron (III) fluoride particles ($FeF_3$) which contaminate the laser chamber 10. The iron (III) fluoride particles interfere with the ionization of the gases by the electrode structure 22 for the production of the high energy discharges. Third, the production of iron (III) fluoride also catalyses the degradation of the lubricant used with the bearing assembly. More specifically, perfluoropolyalkylether (PFPE) synthetic oils, such as Krytox 143AB, manufactured by E. I. Du Pont Company, are typically used to lubricate the bearing assembly. The iron (III) fluoride, a Lewis acid catalyst, degrades the PFPE fluid at asperity contact temperatures of up to about 350° C. The scheme for the degradation of PFPE through an autocatalytic pathway is illustrated in FIG. 12. $R_f$ and $R'_f$ in FIG. 12 are PFPE end groups of an unspecified length. The degradation causes not only the production of volatile acyl fluoride and ketone compounds but also the reduction of the average molecular weight of the lubricant. The degraded product escapes from the bearing assembly, causing mechanical wear and failure of the bearing assembly.

The contamination of the laser chamber 10 with iron (III) fluoride particles diminishes the performance of the pulsed laser system. The requirement to continually replace or re-passivate the ferrous metal bearing, in order to effectively operate the blower assembly 70, reduces the gas life cycle of the laser chamber 10. As a result, the overall efficiency and production of the pulsed laser system is vitiated.

SUMMARY OF THE INVENTION

The present invention broadly provides a laser chamber for a compact excimer laser. The laser chamber of the present invention, more specifically, has an electrode structure defining an electrical discharge area for producing a high energy discharge. The high energy discharge ionizes gases, such as krypton and fluorine, and causes the gases to react chemically. A pre-ionizer may be disposed near the electrical discharge area to facilitate the ionization of the gases. A main insulator is also disposed adjacent to the electrical discharge area to insure that a proper electrical discharge is conducted by the electrode structure. The high energy discharge produces a large amount of local heating in the gases, and accordingly, a head exchanger is provided to reduce the temperature of the gases. The laser chamber further includes a blower assembly for the proper circulation and the efficient flow of gases during the operation of the excimer laser.

The blower assembly of the present invention preferably comprises a drive side shaft supported by the laser chamber, a driving assembly operatively engaged to the drive side shaft for rotating the drive side shaft, and a fan assembly engaged to the drive side shaft for circulating the gases. The blower assembly further includes an idle side shaft for supporting the fan assembly. The drive side shaft, the idle side shaft and the fan assembly are manufactured from materials, such as nickel plated aluminum, monel, tin, etc., which are resistant to erosion when exposed to the gases. The blower assembly further includes bearing assemblies circumscribing the drive and idle side shafts for rotatably supporting the drive and idle side shafts to the laser chamber. The bearing assemblies are manufactured from a ceramic compound, such as silicon nitride ($Si_3N_4$). The bearing assemblies, moreover are lubricated with a synthetic lubricant, such as perfluoropolyalkylether (PFPE).

The present invention, moreover, broadly provides a method for circulating gases in a laser chamber comprising:
a) disposing a blower assembly within the laser chamber, the blower assembly comprising a drive side shaft, a fan assembly engaged to the drive side shaft for circulating gases, and a bearing assembly circumscribing the drive side shaft, wherein the bearing assembly comprises a ceramic compound; and
b) rotating the drive side shaft to operatively drive the fan assembly and to circulate gases between the fan assembly and in the laser chamber.

The gases of the laser chamber also circulate against the bearing assembly. The ceramic quality protects the bearing assembly against any essential corrosion. Moreover, the ceramic compound does not react with the gases so as to contaminate the gases or adversely affect the chemical structure of the lubricant.

These, together with the various ancillary advantages and features which will become apparent to those skilled in the art as the following description proceeds, are attained by this novel blower assembly for a pulsed laser system and this novel method, a preferred embodiment thereof shown with reference to the accompanying drawings, by way of example only, wherein:

BRIEF DESCRIPTION OF THE DRAWINGS

FIG. 12 is a scheme illustrating the chemical reaction of a perfluoropolyalkylether (PFPE) lubricant and iron (III) fluoride ($FeF_3$) which results in the production of lower molecular weight acyl fluorides and ketones.

DESCRIPTION OF THE PREFERRED EMBODIMENTS

Figure 1:
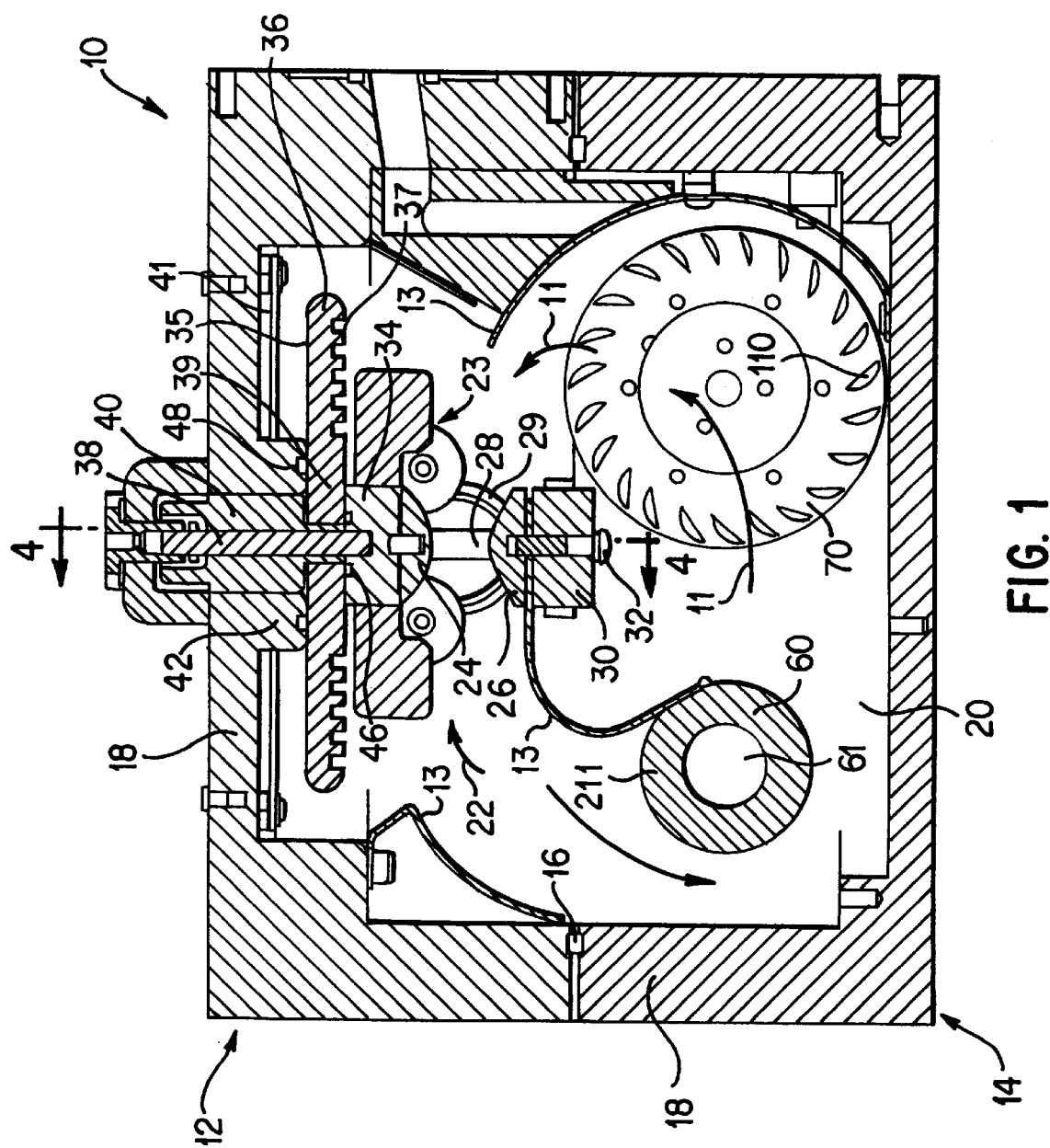
FIG. 1 is an end cross sectional view of a laser chamber used in a pulsed laser system, including a blower assembly of the present invention.

Referring in detail now to the drawings wherein similar parts of the present invention are represented by like reference numerals, there is seen in FIGS. 1–5 a laser chamber 10, similar to Excimer Laser Model 5000, produced by CYMER, Inc., San Diego, Calif. The laser chamber 10 is thoroughly disclosed in U.S. Pat. No. 4,959,840 to Akins et al., assigned to the assignee of the present invention, and fully incorporated herein by reference in its entirety as if repeated verbatim immediately hereinafter. The laser chamber 10 is formed by a pair of half-housing members, an upper housing member 12 and a lower housing member 14, coupled together and sealed using an "O" ring seal 16. The coupled half-housing members 12 and 14 are, in essence, interconnected walls, collectively and/or individually illustrated as 18. The interconnected walls 18 define a laser cavity 20 which contains various components of the laser chamber 10. The walls 18 of the laser chamber 10 may be manufactured from any suitable material that is compatible with the specific gases (e.g., fluorine and krypton) used in the laser chamber 10, such as nickel plated aluminum, tin, monel, gold, etc.

Figure 4:
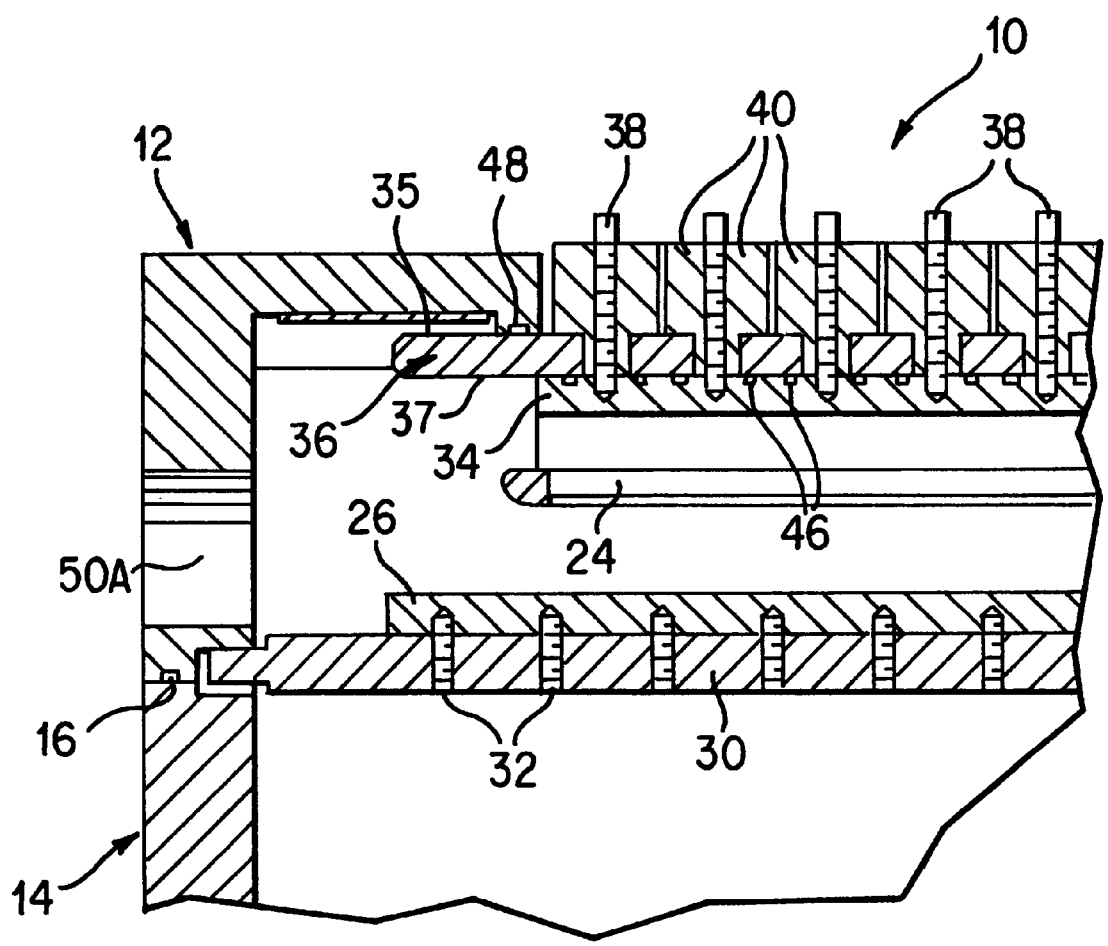
FIG. 4 is a partial, side cross sectional view of the laser chamber, taken in the direction of the arrows and along the plane of line 4—4 of FIG. 1.
Figure 5:
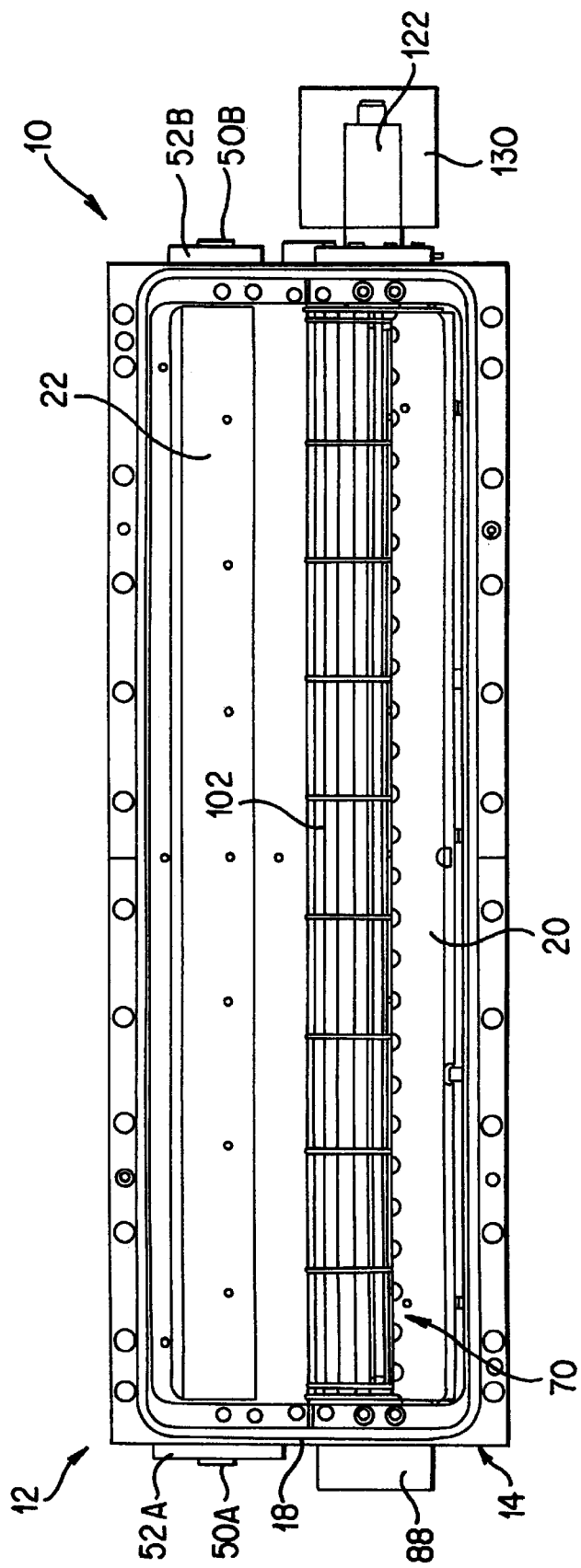
FIG. 5 is a side cross sectional view of the laser chamber of FIG. 1, illustrating the blower assembly.
Figure 6:
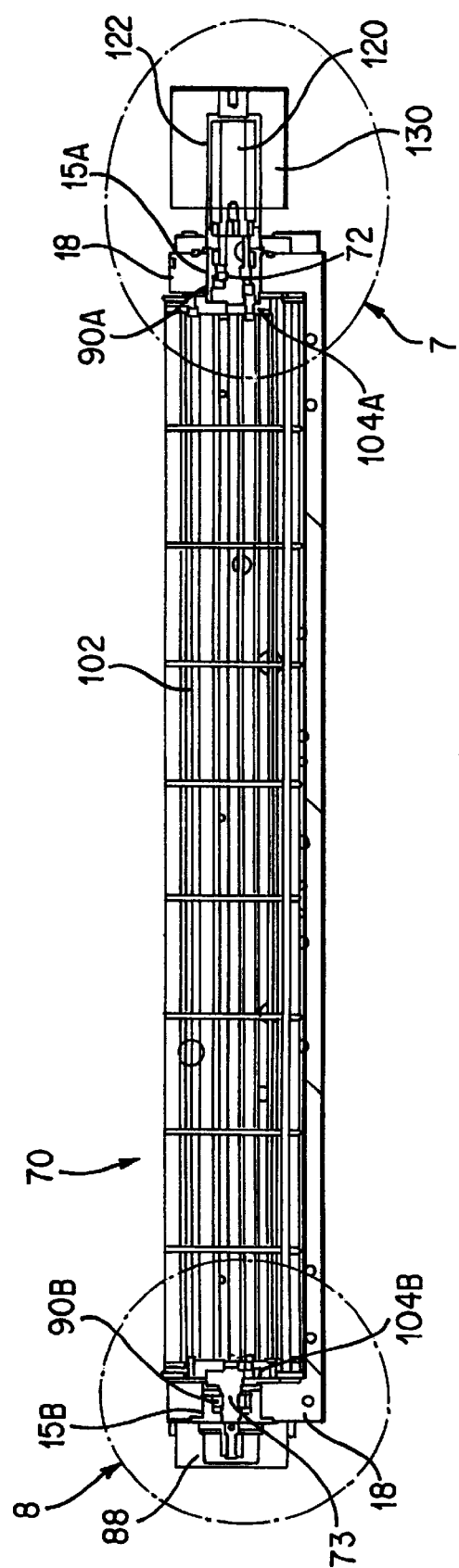
FIG. 6 is a side elevational view of the blower assembly of the present invention supported by the laser chamber.

Located within the laser cavity 20 is an electrode structure, generally illustrated as 22. The electrode structure 22 comprises a cathode 24 and an anode 26, separated by a distance defining an electrical discharge area 28. As can be seen by FIG. 4, the cathode 24 and the anode 26 are each formed as one continuous member. It is understood that the cathode 24 and the anode 26 may also be formed of a series of members. The cathode 24 and the anode 26 may be manufactured from any suitable high purity, insulated metal capable of resisting erosion so as to avoid contaminating the gases which are introduced into the laser cavity 20. For example, the electrode structure 22 may be manufactured from brass insulated with a ceramic compound, such as alumina.

A base member 30, made from a suitable conducting material, supports the anode 26 with threaded rods 32. A spacer member 34 contacts the cathode 24. The spacer member 34 is disposed adjacent to a main insulator 36. The main insulator 36 separates and insulates high voltage connectors 38 from one another. The high voltage connectors 38 engage the spacer member 34 to introduce a high voltage to the cathode 24. The high voltage connectors 38 extend through insulating bushings 40, which are made from any suitable material including ceramic, plastic, etc.

The upper housing member 12 includes downwardly extending ledge portions 42 so that the main insulator 36 is spaced from or positioned at a distance away from the upper wall 18. A first set of "O" rings 46, disposed in recesses (omitted from FIGS. 1 and 4) of the spacer member 34, communicates with a lower surface 37 of the main insulator 36. A second set of "O" rings 48, disposed in recesses (omitted from FIGS. 1 and 4) of the ledge portions 42, communicates with an upper surface 35 of the main insulator 36. Accordingly, a central portion 39 of the main insulator 36 is held in compression between the first set 46 and the second set 48 of the "O" rings (see FIG. 1). The main insulator 36 electrically insulates the cathode 24 from the upper wall 18 to insure that a proper electrical discharge occurs between the cathode 24 and the anode 26.

A high energy discharge can be produced in the electrical discharge area 28 by the application of a high voltage, e.g., 20 kilovolts, to the cathode 24. More specifically, the application of a high voltage to the cathode 24 through the high voltage connectors 38 and the spacer member 34 produces the high energy discharge in the electrical discharge area 28. The high energy discharge ionizes the gases, illustrated by the shaded region 29, in the vicinity of the electrical discharge area 28 and causes these gases to react chemically. For example, the laser gas may include krypton (Kr) and fluorine ($F_2$), which chemically react to produce KrF. The formation of KrF produces an energy radiation in a very narrow band of wave lengths such as in the excimer range. The energy radiation is directed to an optical element 50A (e.g., a window) at one end and to a corresponding optical element 50B at an opposing end (see FIGS. 3 and 5). The energy radiation is reflected between the opposing optical elements 50A and 50B and is reinforced in each reflection. A portion of the energy radiation moving in each cycle between the opposing optical elements 50A and 50B passes through one of the optical elements such as the optical element 50A. The energy radiation passing through the optical element 50A, has a narrow band of frequencies as well as a high intensity and narrow width. The optical elements 50A and 50B may be manufactured from any suitable material such as magnesium fluoride which is transparent in deep ultraviolet light. The optical elements 50A and 50B may be engaged to window structures or a window caps 52A and 52B, respectively.

The high energy discharge in the electrical discharge area 28 causes the temperature of the gases to increase. The thermal disturbance produces an acoustic wave and/or shock wave which propagates in an outwardly direction from the electrical discharge area 28 and reflects off the walls 18. The reflection of the waves back into the electrical discharge area 28 causes interference with the energy efficiency and stability of the laser system. Accordingly, angle reflectors (omitted from the Figures) and/or modulated inner wall portions (omitted from the Figures) are included in the laser chamber in accordance with application Ser. No. 09/036,158, filed Mar. 6, 1998, to Juhasz, et al., entitled "Laser Chamber with Minimized Acoustic and Shock Wave Disturbances," assigned to the assignees of the present invention, and fully incorporated herein by reference in its entirety as if repeated verbatim immediately hereinafter.

Pre-ionizers, generally illustrated as 23 in FIG. 1, may be disposed in the laser cavity 20 to facilitate the ionization of the gases, the details of which are included in U.S. Pat. No. 5,337,330 to Larson, assigned to the assignees of the present invention, and fully incorporated herein by reference in its entirety as if repeated verbatim immediately hereinafter. The pre-ionizers 23 introduce an ultraviolet light, produced by a corona discharge, to the gases immediately prior to the application of each voltage pulse between the cathode 24 and the anode 26. As a result, the gases within the electrical discharge area 28 become flooded with free electrons (e.g., $10^6$ to $10^8$ per $cm^3$) prior to the production of the high energy discharge by the electrode structure 22.

In addition to the main insulator 36, ceramic plates 41 are engaged to the upper wall 18. The ceramic plates 41 insure that the electrical current, which is flowing along the main insulators 36, does not transfer to the upper wall 18. The main insulator 36 and the ceramic plates 41 are coated with an insulator (omitted from the Figures), the details of which are described in application Ser. No. 09/089,330, filed Jun. 2, 1998, to Ishihara et al., entitled "Laser Chamber Incorporating Ceramic Insulators Coated with Dielectric Material," assigned to the assignee of the present invention, and fully incorporated herein by reference in its entirety as if repeated verbatim immediately hereinafter.

Figure 2:
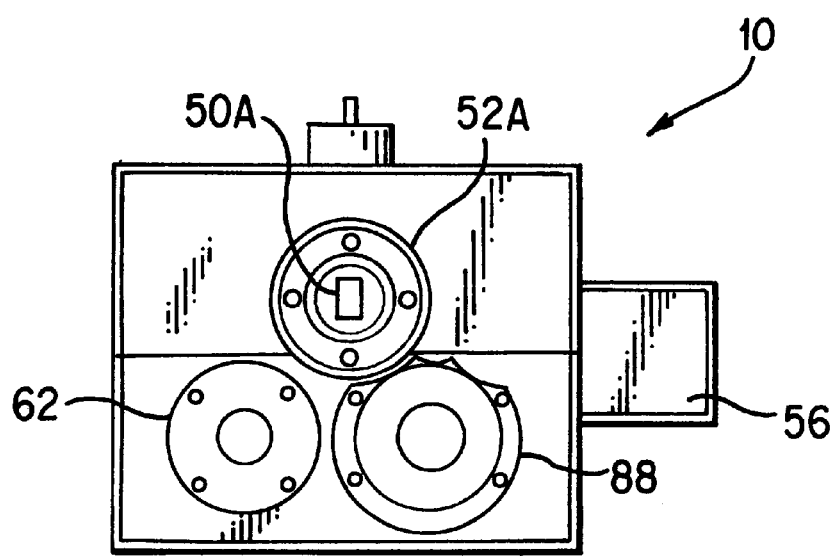
FIG. 2 is an exterior, elevational view of one end of the laser chamber of FIG. 1.
Figure 3:
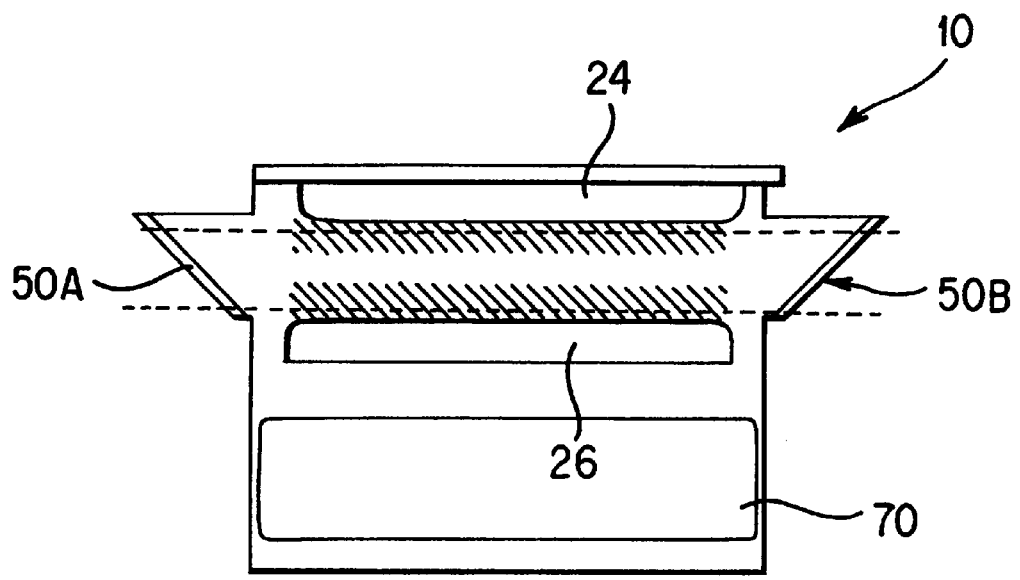
FIG. 3 is a schematic view of one side of the laser chamber of FIG. 1.

The laser chamber 10, moreover, may include a gas scoop (omitted from the Figures) for allowing a portion of the gases circulating about the laser cavity 20 to be siphoned for filtering by a filter 56, as illustrated in FIG. 2. The filter 56 may be an electrostatic precipitator, the details of which are described in U.S. Pat. No. 5,048,041 to Akins et al., assigned to the assignees of the present invention, and fully incorporated herein by reference in its entirety as if repeated verbatim immediately hereinafter. In general, if the gas is a mixture of Ne, Kr and F, the gas may become contaminated with metal fluoride particles which are formed each time the laser is discharged. In other words, each time the laser is discharged, a small amount of metal may erode from the electrode structure 22 and may react with the gases to produce the metal fluoride particles. The filter 56 removes these particles and provides particle-free gases to selected portions of the laser chamber 10, as described in the above-referenced '041 patent.

The high energy discharge, as mentioned above, produces a large amount of local heating in the gases. Accordingly, a heat exchanger 60, is disposed within the laser cavity 20 to decrease the temperature of the gases. The heat exchanger 60 is supported on the walls 18 of the laser chamber 10 by end caps, one of which is illustrated as 62 in FIG. 2. A fluid coolant is introduced through conduit 61 of the heat exchanger 60 to cool the circulating gases.

A blower assembly, generally illustrated as 70, provides for the proper circulation and efficient flow of gases during the operation of the laser chamber 10. As illustrated in FIGS. 5–8, the blower assembly 70 comprises a driver side shaft 72 generally defined by an integral structure having an inner disc portion 74A, an outer disc portion 76A concentrically extending from the inner disc portion 74A, and a rod section 78A concentrically extending from the outer disc portion 76A. The diameter of the inner disc portion 74A is greater than the diameter of the outer disc portion 76A, which in turn is greater than the diameter of the rod section 78A. Therefore, the outer disc portion 76A terminates in a shoulder 80A before extending to the rod section 78A. The drive side shaft 72 may be manufactured from materials which are essentially resistant to corrosion when exposed to the gases (e.g., a mixture of noble gases and fluorine) so as to protect the mechanical structure and integrity of the drive side shaft 72. The materials employed must further be capable of resisting erosion so as to avoid contaminating the gases. For example, the drive side shaft 72 may be manufactured from nickel plated aluminum, monel, etc. The drive side shaft 72, circumscribed by a bearing assembly 90A, protrudes through a slot 15A of the wall 18. The bearing assembly 90A is supported within the slot 15A by an "O" ring 82A. Alternatively, the bearing assembly 90A can be hard mounted within the slot 15A without the support of the "O" ring 82A.

Figure 8:
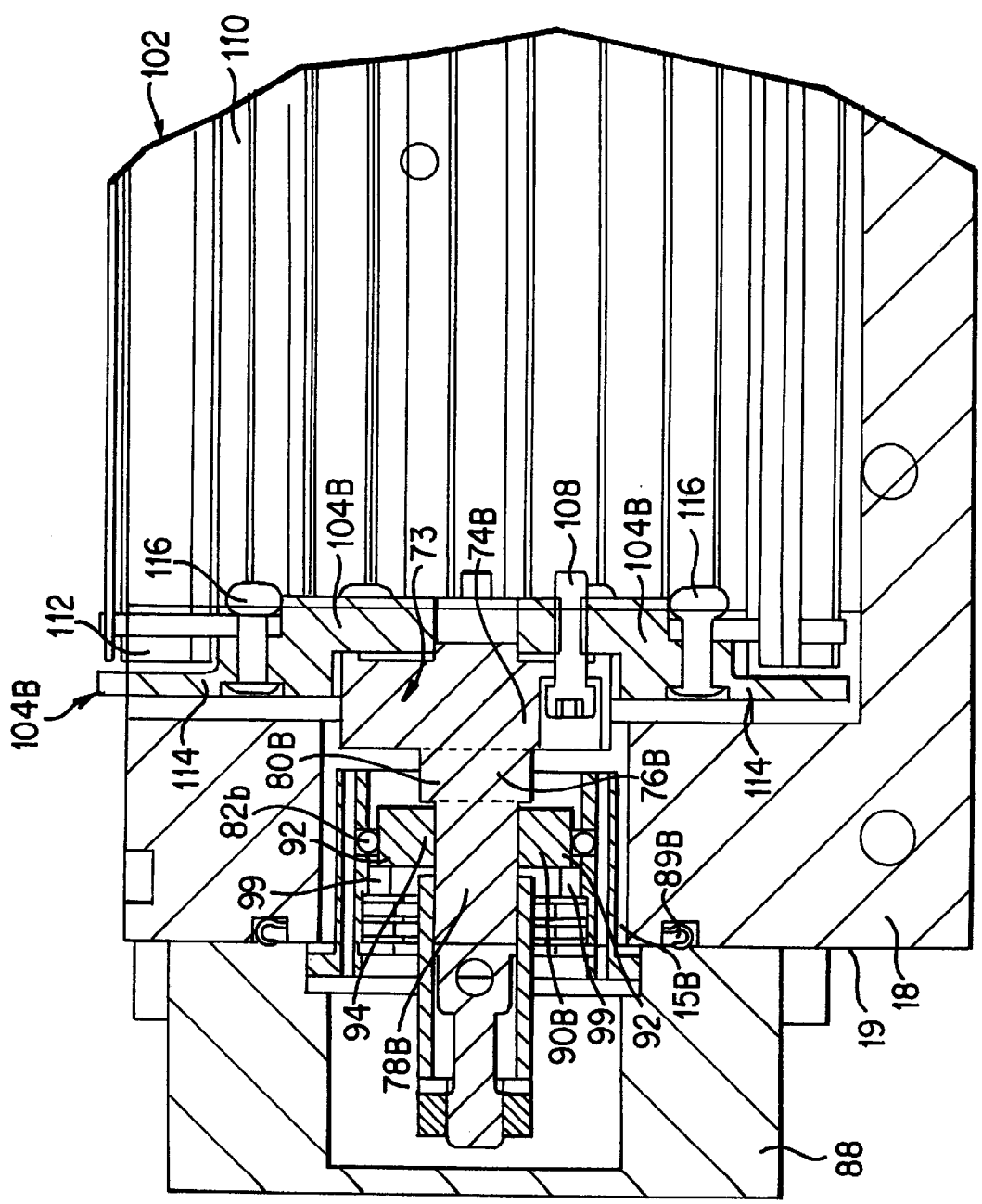
FIG. 8 is an enlarged cross sectional view of the blower assembly taken from encircled area 8 of FIG. 6, illustrating an idle side shaft, a bearing assembly supporting the idle side shaft, and the fan assembly coupled to the idle side shaft.

The blower assembly 70 may additionally comprise an idle side shaft 73, respectively opposing the drive side shaft 72, for supporting a fan assembly 102. Referring to FIG. 8, the idle side shaft 73 is structurally similar to the drive side shaft 72 as it too is generally defined by an integral structure having an inner disc portion 74B, an outer disc portion 76B concentrically extending from the inner disc portion 74B, and a rod section 78B concentrically extending from the outer disc portion 76B. The diameter of the inner disc portion 74B is greater that the diameter of the outer disc portion 76B, which in turn is greater than the diameter of the rod section 78B. Therefore, the outer disc portion 76B terminates in a shoulder 80B before extending into the rod section 78B. The idle side shaft 73 may be manufactured from materials which are resistant to corrosion so as to protect the mechanical structure and integrity of the idle side shaft 73. The materials employed must further be capable of resisting erosion so as to avoid contaminating the gases. For example, the idle side shaft 73 may be manufactured from nickel plated aluminum, monel, etc. The idle side shaft 73, circumscribed by a bearing assembly 90B, protrudes through a slot 15B which respectively opposes the slot 15A. The bearing assembly 90B is supported within the slot 15B by an "O" ring 82B. Alternatively, the bearing assembly 90B can be hard mounted within the slot 15B without the support of the "O" ring 82B. A cover plate 88 is positioned over the slot 15B and is engaged to an outer surface 19 of the wall 18. An "O" ring seal 89B is disposed within a grove 91B on the outer surface 19 of the wall 18. Therefore, the cover plate 88 prevents the gases from leaking out of the slot 15B.

Figure 9:
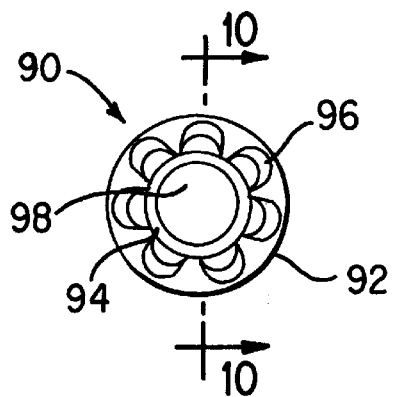
FIG. 9 is an elevational view of one end of the bearing assembly of FIGS. 7 and 8.
Figure 10:
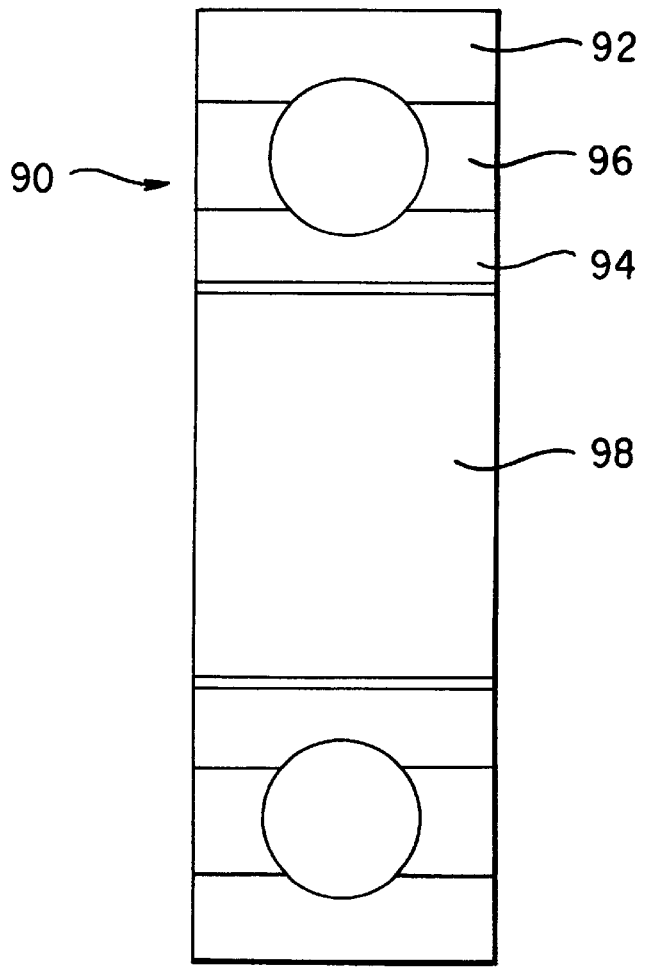
FIG. 10 is a side cross sectional view of the bearing assembly taken in the direction of the arrows and along the plane of line 10—10 of FIG. 9, illustrating an outer race engaged to an inner race by a plurality of balls.
Figure 11:
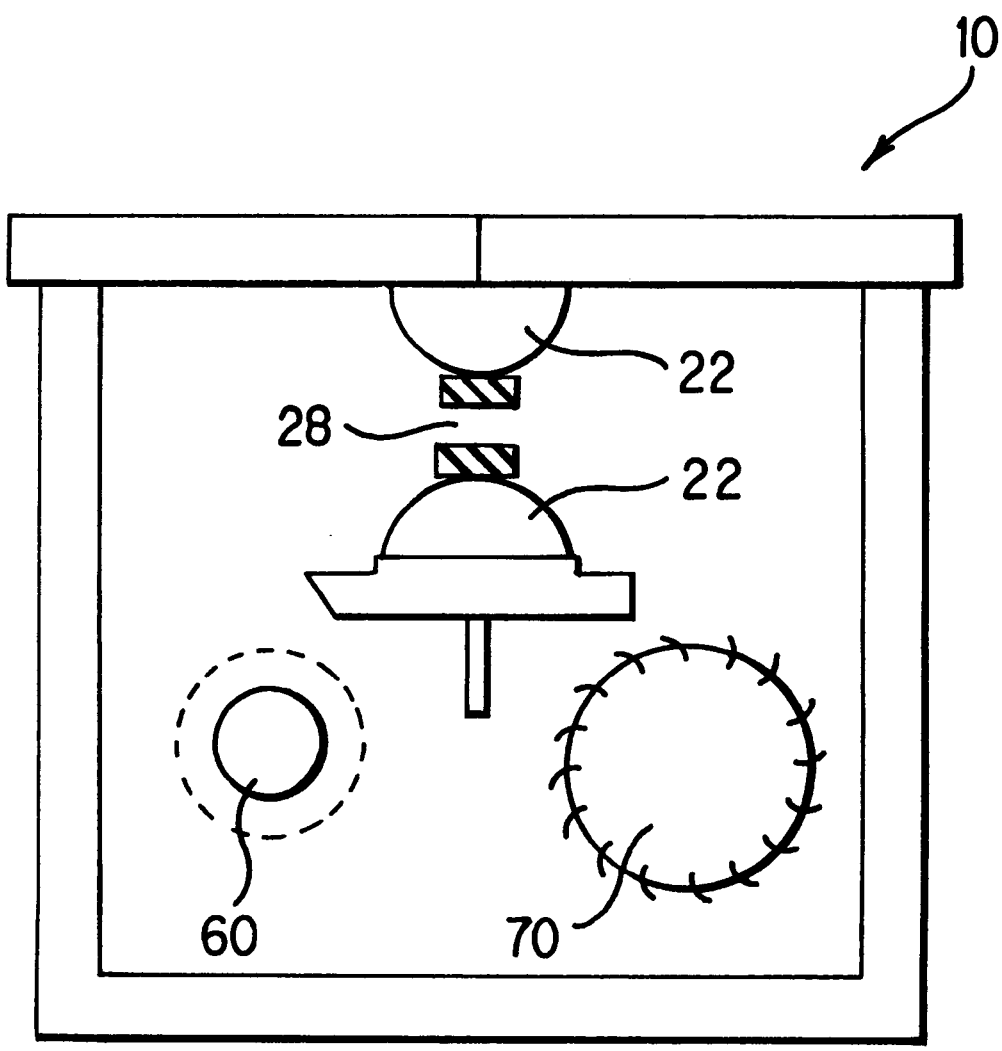
FIG. 11 is an end cross sectional view of a conventional laser chamber.

The bearing assemblies 90A and 90B are generally defined by an outer race 92 rotatably engaged to an inner race 94 by a plurality of balls 96 (see FIGS. 9 and 10). The bearing assemblies 90A and 90B include an inner annular recess 98 which circumscribes and supports the rod sections 78A and 78B of the drive 72 and idle 73 side shafts. The bearing assemblies 90A and 90B may be of any suitable size that is compatible with the thickness of the drive 72 or idle 73 side shafts. The bearing assemblies 90A and 90B may be lubricated to minimize wear during the operation of the bearing assemblies 90A and 90B. The lubricant may include a synthetic oil, such as perfluoropolyalkylether (PFPE) fluid, which is available from several suppliers. A preferred PFPE lubricant is Krytox 143AB, manufactured by E.I. Du Pont Company with offices is Wilmington, Delaware. The bearing assemblies 90A and 90B may be manufactured from any suitable material which is resistant to significant corrosion so as to protect the mechanical structure and integrity of the bearing assemblies 90A and 90B. The material employed should also be capable of resisting significant erosion so as to avoid contaminating the gases. Moreover, the material, acting independently or as a result of a chemical reaction with the gases, should not degrade the lubricant used with the bearing assemblies 90A and 90B. Preferably, the material should include a ceramic compound such as silicon nitride ($Si_3N_4$).

Figure 7:
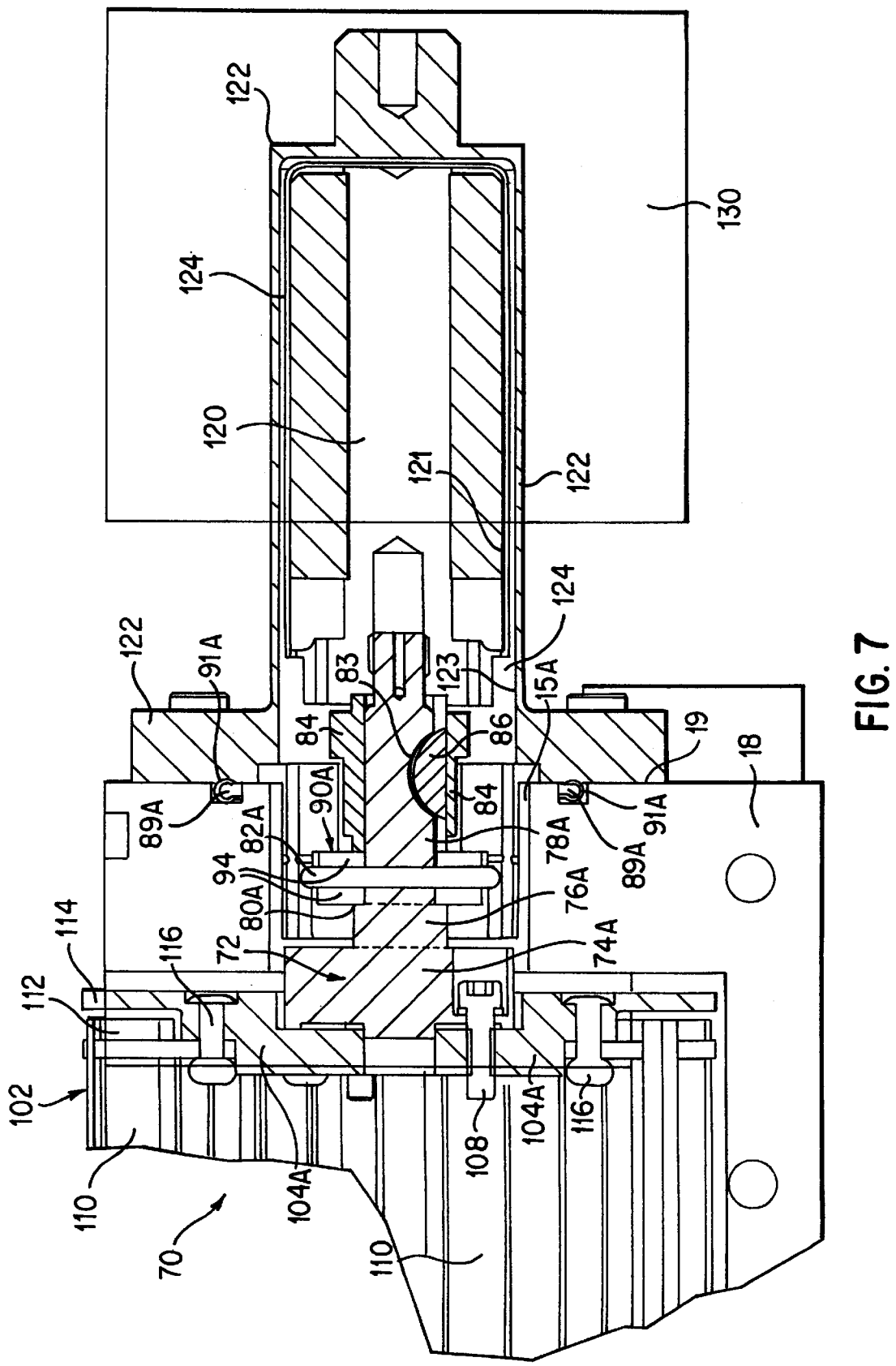
FIG. 7 is an enlarged cross sectional view of the blower assembly taken from encircled area 7 of FIG. 6, illustrating a rotor coupled to a drive side shaft, a bearing assembly supporting the drive side shaft, and a fan assembly coupled to the drive side shaft.

A collar 84 is slidably engaged to the rod section 78A of the drive side shaft 72 and is supported by a key 86 (see FIG. 7). The key 86 is registered in and engaged to a mating slot 83 of the drive side shaft 72. The engagement of a rotor 120 to the drive side shaft 72 compresses the collar 84 against the inner race 94 of the bearing assembly 90A causing the inner race 94 to be compressively sandwiched between the shoulder 80A and the collar 84. As a result, the drive side shaft 72 is rotatably engaged to the bearing assembly 90A. The insertion of the idle side shaft 73 through the inner annular recess 98 of the bearing assembly 90B causes the shoulder 80B to compress the inner race 94 (see FIG. 8). As a result, the outer race 92 of the bearing assembly 90B communicates with and is compressed against a stop member 99.

Ceramic bearings of the type described herein are available from several suppliers such as Cerobear GmbH with offices in Herzagemrath, Germany; Miniature Precision Bearings with offices in Keene, NH and Kayo of Japan. $Si_3N_4$ is Applicant's preferred bearing material; however, zirconium oxide could also be utilized to make the bearings.

The fan assembly, generally illustrated as 102, is used to circulate the gases within the laser cavity 20. The fan assembly 102 comprises a pair of hubs 104A and 104B that are concentrically attached to the inner disc portions 74A and 74B, respectively, by bolts 108. The fan assembly 102 additionally includes a plurality of blades 110, disposed between the opposing pair of hubs 104A and 104B, such that ends 112 of the blades 110 are engaged to an outer peripheral lip 114 of the hubs 104A and 104B by rivets 116. The fan assembly 102 may be manufactured from any suitable material which is resistant to significant corrosion and erosion when exposed to the gases (e.g., a mixture of fluorine and noble gases) employed in the laser chamber 10. For example, the fan assembly 102 may be manufactured from nickel plated aluminum, monel, etc.

The driving assembly, generally illustrated as 132, comprises the rotor 120, e.g., a magnetic rotor, engaged to the rod section 78A of the drive side shaft 72. A drive pressure cup 122 is disposed over the rotor 120 and mounted to the outer surface 19 of the wall 18. An "O" ring seal 89A is disposed within a groove 91A of the outer surface 19 of the wall 18. It can be seen that the rotor 120 is completely enclosed by the engagement of the drive pressure cup 122 to the outer surface 19 of the wall 18. Therefore, the gases which pass and circulate about the drive side shaft 72 and the rotor 120 are impermeably enclosed by the drive pressure cup 122. The rotor is formed by magnets covered by any suitable material, such as 304 CRES IAW ASTM A167/ASTM A240, which is impervious to corrosive effects of the gases. A slight clearance 124 is provided between an outer surface 121 of the rotor 120 and an inner surface 123 of the drive pressure cup 122. The driving assembly 132 further includes a motor (e.g., a stator), schematically illustrated as 130. The motor 130 is disposed over the drive pressure cup 122 to operatively rotate the rotor 120 and the drive side shaft 72. The motor 130 and the rotor 120 form a brushless DC motor which operates in a manner well understood in the art.

To assist in a directional flow of the gases, as illustrated by arrows 11 of FIG. 1, vanes 13 are selectively disposed in the laser cavity 20. The directional flow 11 of the gases is through the electrical discharge area 28, with a counter-clockwise circulation about the heat exchanger 60, and in between blades 110.

To operate the blower 70 of the laser chamber 10, the motor 130 operatively rotates the fan assembly 102. The gases circulate about the laser cavity 20, as indicated by the directional flow arrows 11. Typically, the gases circulate through the electrical discharge area 28 with a flow velocity of about 22–30 meters per second, however, this amount is dictated by the frequency of the pulsed laser system. The gases also circuitously flow about the drive 72 and idle 73 side shafts and circulate against the bearing assemblies 90A and 90B. The contact of the gases against the bearing assemblies 90A and 90B does not result in any essential corrosion to the outer race 92, the inner race 94, or the balls 96. The ceramic quality (i.e., $Si_3N_4$) of the bearing assemblies 90A and 90B also resists any essential erosion so as to avoid contaminating the gases. Moreover, the ceramic compound (i.e., $Si_3N_4$) does not chemically react with the gases. Accordingly, the lubricant (e.g. PFPE) employed with the bearing assemblies 90A and 90B does not degrade.

Thus, while the present invention has been described herein with reference to particular embodiments thereof, a latitude of modifications, various changes and substitutions are intended in the foregoing disclosure, and it will be appreciated that in some instances some features of the invention will be employed without a corresponding use of the other features without departing from the scope of the invention as set forth.

What is claimed is:

1. A laser apparatus, comprising:
   a) a laser chamber having interconnected walls defining a laser cavity inside said laser chamber, said laser cavity housing gases;
   b) a drive side shaft supported by said laser chamber;
   c) a first bearing assembly circumscribing said drive side shaft and exposed to said gases within said laser cavity, said first bearing assembly comprising a ceramic compound such that said gases do not substantially react with said ceramic compound;
   d) a driving assembly operatively engaged to said drive side shaft for rotating said drive side shaft; and
   e) a fan assembly disposed in said laser cavity and engaged to said drive side shaft for circulating said gases;
   wherein said drive side shaft is generally defined by an integral structure having an inner disc portion, an outer disc portion extending from said inner disc portion, a rod extending from said outer disc portion, and a shoulder formed on said outer disc portion such that said first bearing assembly is supporting said rod and communicating with said shoulder.

2. The laser apparatus of claim 1, wherein said laser chamber comprises an electrode structure disposed within said laser cavity, said electrode structure comprising an anode and a cathode separated by a distance defining an electrical discharge area; a pre-ionizer disposed within said laser cavity and positioned proximal said electrode structure; a heat exchanger disposed within said laser cavity; an insulator member disposed within said laser cavity such that said insulator member is positioned intermediate said cathode and one of said walls closest to said cathode; and at least one vane selectively positioned in said laser cavity for guiding a directional flow of gases.

3. The laser apparatus of claim 1, wherein said ceramic compound comprises silicon nitride ($Si_3N_4$).

4. The laser apparatus of claim 1, additionally comprising a collar, slidably engaged to said rod for compressing said first bearing assembly against said shoulder.

5. The laser apparatus of claim 4, additionally comprising a key engaged to said rod for supporting said collar.

6. The laser apparatus of claim 1, additionally comprising an idle side shaft engaged to said fan assembly and a second bearing assembly circumscribing said idle side shaft and exposed to said gases within said laser cavity, said second bearing assembly comprising a ceramic compound such that said gases do not substantially react with said ceramic compound.

7. The laser apparatus of claim 6, wherein said ceramic compound comprises silicon nitride ($Si_3N_4$).

8. The laser apparatus of claim 6, wherein said idle side shaft is generally defined by said integral structure having said inner disc portion, said outer disc portion extending from said inner disc portion, said rod extending from said outer disc portion, and said shoulder formed on said outer disc portion such that said second bearing assembly is supporting said rod and communicating with said shoulder.

9. The laser apparatus of claim 1, wherein said driving assembly comprises a rotor engaged to said drive side shaft, a motor disposed over said rotor for operatively driving said rotor, and a drive pressure cup disposed between said rotor and said motor.

10. The laser apparatus of claim 1, wherein said fan assembly comprises a first hub coupled to said drive side shaft, a second hub coupled to said idle side shaft, and a plurality of blades disposed between said first hub and said second hub.

11. The laser apparatus of claim 1, wherein said ceramic compound comprises zirconium oxide ($ZrO_2$).

12. A blower for circulating gases, comprising:
 a) a fan assembly for circulating gases;
 b) a drive side shaft coupled to said fan assembly for operatively driving said fan assembly;
 c) a first bearing assembly circumscribing said drive side shaft for supporting said drive side shaft, said first bearing assembly comprising a ceramic compound; and
 d) a driving assembly operatively engaged to said drive side shaft for rotating said drive side shaft;
 wherein said drive side shaft is generally defined by an integral structure having an inner disc portion, an outer disc portion extending from said inner disc portion, a rod extending from said outer disc portion, and a shoulder formed on said outer disc portion such that said first bearing assembly is supporting said rod and communicating with said shoulder.

13. The blower of claim 12, wherein said ceramic compound comprises silicon nitride ($Si_3N_4$).

14. The blower of claim 12, additionally comprising an idle side shaft engaged to said fan assembly and a second bearing assembly circumscribing said idle side shaft, said second bearing assembly comprising a ceramic compound.

15. The blower of claim 14 wherein said ceramic compound comprises silicon nitride ($Si_3N_4$).

16. The blower of claim 14 wherein said ceramic compound comprises zirconium oxide ($ZrO_2$).

17. The blower of claim 12, wherein said fan assembly comprises a first hub coupled to said drive side shaft, a second hub coupled to said idle side shaft, and a plurality of blades disposed between said first hub and said second hub.

18. The blower of claim 12, wherein said driving assembly comprises a rotor engaged to said drive side shaft and a motor disposed over said rotor for operatively driving said rotor.

19. A method for circulating gases in a laser chamber, comprising:
 a) disposing a blower assembly within said laser chamber, said blower assembly comprising a drive side shaft, a fan assembly engaged to said drive side shaft for circulating gases, and a bearing assembly circumscribing said drive side shaft, wherein said bearing assembly comprises a ceramic compound and wherein said drive side shaft is generally defined by an integral structure having an inner disc portion, an outer disc portion extending from said inner disc portion, a rod extending from said outer disc portion, and a shoulder formed on said outer disc portion such that said first bearing assembly is supporting said rod and communicating with said shoulder; and
 b) rotating said drive side shaft to operatively drive said fan assembly and to circulate gases between said fan assembly and in said laser chamber.

20. The method of claim 19, wherein said ceramic compound comprises silicon nitride ($Si_3N_4$).

21. The method of claim 19, wherein said ceramic compound comprises zirconium oxide ($ZrO_2$).

22. The method of claim 19, additionally comprising, prior to rotating step (b), providing a lubricant to said bearing assembly.

23. The method of claim 19, additionally comprising circulating said gases against said bearing assembly without any essential corrosion to said bearing assembly.

24. The method of claim 19, additionally comprising circulating said gases against said bearing assembly without any essential contamination to said gases.

25. The method of claim 22, additionally comprising circulating said gases against said bearing assembly without any essential degradation of said lubricant.

* * * * *